(12) United States Patent
Ferguson et al.

(10) Patent No.: US 7,634,587 B2
(45) Date of Patent: Dec. 15, 2009

(54) I/O DESCRIPTOR CACHE FOR BUS MASTERING I/O CONTROLLERS

(75) Inventors: David K. Ferguson, Sunnyvale, CA (US); Robert L. Bailey, La Selva Beach, CA (US); Brian D. Howard, Portola Valley, CA (US); Lesley B. Wynne, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 469 days.

(21) Appl. No.: 10/916,988

(22) Filed: Aug. 11, 2004

(65) Prior Publication Data

US 2006/0036776 A1    Feb. 16, 2006

(51) Int. Cl.
- *G06F 3/00* (2006.01)
- *G06F 13/00* (2006.01)
- *G06F 5/00* (2006.01)
- *G06F 13/12* (2006.01)
- *G06F 13/20* (2006.01)
- *G06F 13/36* (2006.01)

(52) U.S. Cl. .................. 710/5; 710/4; 710/30; 710/33; 710/36; 710/52; 710/64; 710/313; 710/315; 711/113

(58) Field of Classification Search .............. 710/3, 710/5, 52, 313; 711/118, 3
See application file for complete search history.

(56) References Cited

U.S. PATENT DOCUMENTS

| | | | | |
|---|---|---|---|---|
| 5,528,764 A | * | 6/1996 | Heil | 710/113 |
| 5,555,395 A | * | 9/1996 | Parks | 711/145 |
| 5,712,970 A | * | 1/1998 | Arnott et al. | 714/6 |
| 5,987,568 A | * | 11/1999 | Adams et al. | 711/118 |
| 6,044,225 A | * | 3/2000 | Spencer et al. | 710/52 |
| 6,745,264 B1 | * | 6/2004 | Luke et al. | 710/52 |
| 6,795,208 B1 | * | 9/2004 | Tanaka | 358/1.16 |
| 6,832,295 B1 | * | 12/2004 | Stonecypher | 711/135 |
| 6,990,550 B2 | * | 1/2006 | Hesse et al. | 710/313 |
| 7,233,986 B1 | * | 6/2007 | Jair et al. | 709/223 |
| 2002/0087652 A1 | * | 7/2002 | Davis et al. | 709/213 |
| 2004/0024920 A1 | * | 2/2004 | Gulick et al. | 710/1 |
| 2004/0030840 A1 | * | 2/2004 | Hesse et al. | 711/137 |
| 2004/0049618 A1 | * | 3/2004 | Schmisseur et al. | 710/104 |
| 2006/0004941 A1 | * | 1/2006 | Shah et al. | 711/3 |

OTHER PUBLICATIONS

"Universal Serial Bus Specification," Revision 2.0 (Apr. 27, 2000), pp. 1-2.*

* cited by examiner

*Primary Examiner*—Tariq R. Hafiz
*Assistant Examiner*—Henry Yu
(74) *Attorney, Agent, or Firm*—Park, Vaughan & Fleming LLP; Shun Yao

(57) ABSTRACT

One embodiment of the present invention provides a system that includes an I/O descriptor cache that is accessed by a bus mastering I/O controller. The I/O descriptor cache stores descriptors that describe data to be transferred during corresponding I/O operations. The system also includes an I/O controller configured to control one or more I/O devices. This I/O controller is configured to access I/O descriptors stored in the I/O descriptor cache without having to access the main memory, thereby conserving I/O bandwidth and power.

9 Claims, 5 Drawing Sheets

I/O DESCRIPTOR CACHE FOR BUS MASTERING I/O CONTROLLERS

BACKGROUND

1. Field of the Invention

The present invention relates to the design of computer systems. More specifically, the present invention relates to a method and an apparatus for improving the performance of a computer system by providing an I/O descriptor cache that can be efficiently accessed by bus mastering I/O controllers.

2. Related Art

Computer systems are often connected to a large number of peripheral devices, such as printers, scanners, and storage devices. These peripheral devices (also referred to as I/O devices) are normally coupled to the computer system through a peripheral bus, such as a USB bus. Typically, one or more I/O controllers coordinate communications between I/O devices and the computer system.

For example, the Universal Serial Bus (USB) provides a standard interface that allows a wide range of devices to couple to a computer system in a plug-and-play manner. A USB system typically operates using four layers: Client Software/USB Driver, Host Controller Driver, Host Controller, and USB Device. The Host Controller and Host Controller Driver work in tandem to coordinate communications between the Client Software/USB Driver and the USB Device.

During operation, the Host Controller frequently polls USB control objects (called descriptors) associated with data transfers. These descriptors are used to describe the data to be transferred and typically reside in main memory. Consequently, every time the Host Controller reads the descriptors during the frequent polling operations, it consumes bandwidth of the I/O bus and the memory system. Furthermore, if the computer system supports a cache coherence protocol, these frequent read operations prevent cache-coherence circuitry within the processor from entering a sleep mode, which causes extra power consumption.

Hence, what is needed is a method and an apparatus for polling I/O descriptors without the problems described above.

SUMMARY

One embodiment of the present invention provides a system that includes an I/O descriptor cache that is accessed by a bus mastering I/O controller. The I/O descriptor cache stores descriptors that describe data to be transferred during corresponding I/O operations. The system also includes an I/O controller configured to control one or more I/O devices. This I/O controller is configured to access I/O descriptors stored in the I/O descriptor cache without having to access the main memory, thereby conserving I/O bandwidth and power.

In a variation of this embodiment, the I/O descriptor cache resides in an additional memory address space which is separate from the address space used by the main memory.

In a further variation, the system includes a driver configured to initialize the additional memory space.

In a further variation, the I/O controller is a Universal Serial Bus (USB) Host Controller; and the I/O descriptor cache is configured to store USB descriptors required by the USB Host Controller.

In a variation of this embodiment, the I/O controller and the I/O descriptor cache reside in the same device, thereby allowing the I/O controller to access the I/O descriptor cache without consuming bandwidth of a system bus.

In a further variation, the I/O controller and the I/O descriptor cache reside in the same PCI device, and the system bus is a PCI bus.

In a variation of this embodiment, the I/O descriptor cache is configured to function as a device on a system bus; and the I/O descriptor cache is addressable over the system bus, thereby allowing other controllers on the system bus to access the I/O descriptor cache over the system bus.

In a further variation, the I/O descriptor cache is configured to function as a PCI device, and the system bus is a PCI bus.

In a further variation, the I/O descriptor cache is configured to store USB descriptors; and the I/O descriptor cache resides in the same Application-Specific Integrated Circuit (ASIC) as a USB controller that accesses the I/O descriptor cache.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

I/O Controllers in a Computer System

Figure 1:
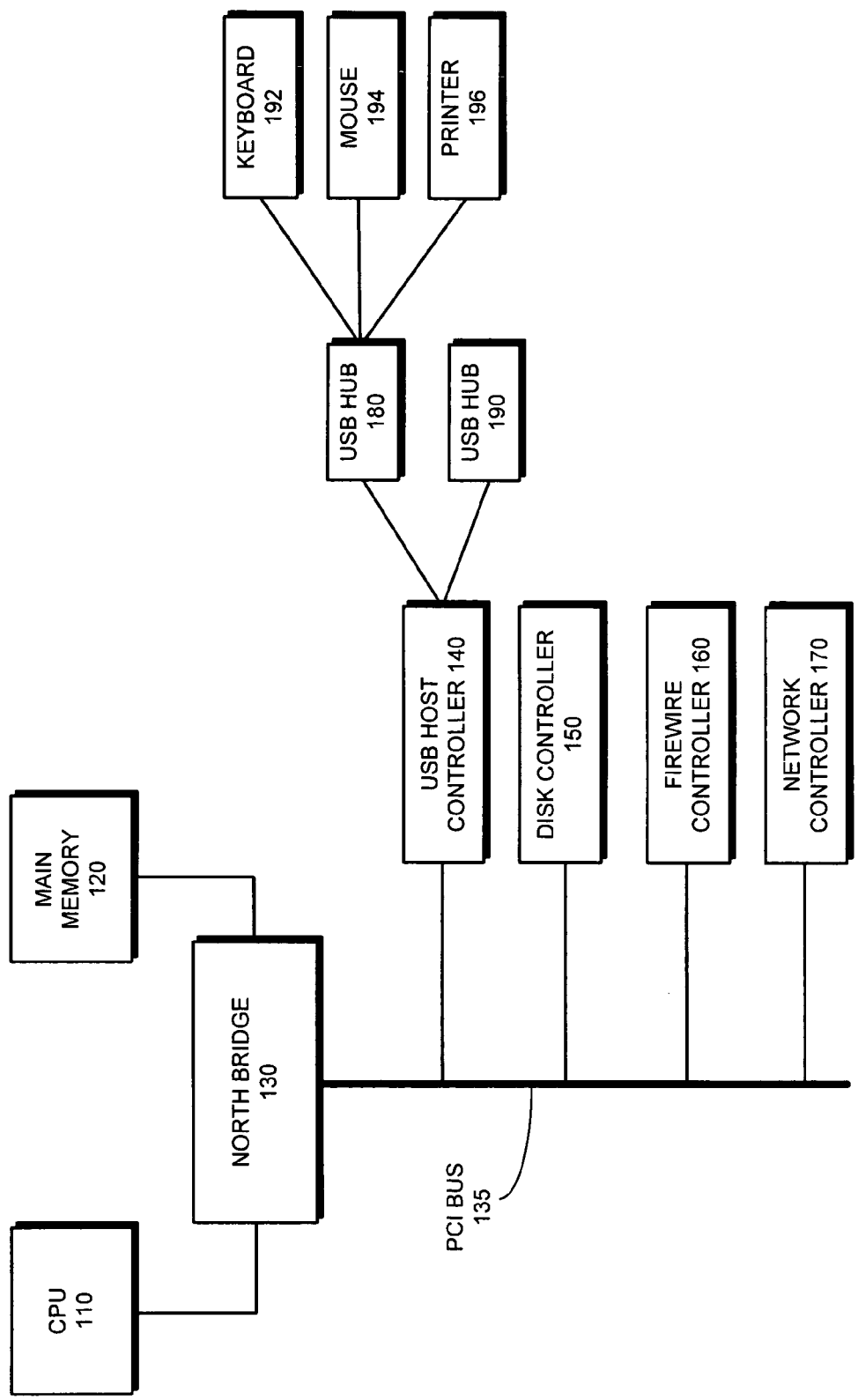
FIG. 1 illustrates a computer system which includes a USB Host Controller and a number of USB devices.

FIG. 1 illustrates a computer system which includes a USB Host Controller and a number of USB devices. In a typical computer system, such as the one shown in FIG. 1, CPU 110 and main memory (also called shared RAM) 120 are interconnected by north bridge 130. North bridge 130 connects CPU 110 and main memory 120 to PCI bus 135. PCI bus 135 provides a shared communication link between I/O devices, CPU 110, and main memory 120.

In the example shown in FIG. 1, a number of I/O controllers are coupled to PCI bus 135. USB Host Controller 140 is coupled to USB hubs 180 and 190. USB hub 180 in turn is coupled to USB devices, such as keyboard 192, mouse 194, and printer 196. USB Host Controller 140 coordinates data transfers among these devices. PCI bus 135 may also link together other I/O controllers, such as disk controller 150, firewire controller 160, and network controller 170.

Operation of USB Host Controllers

Figure 2:
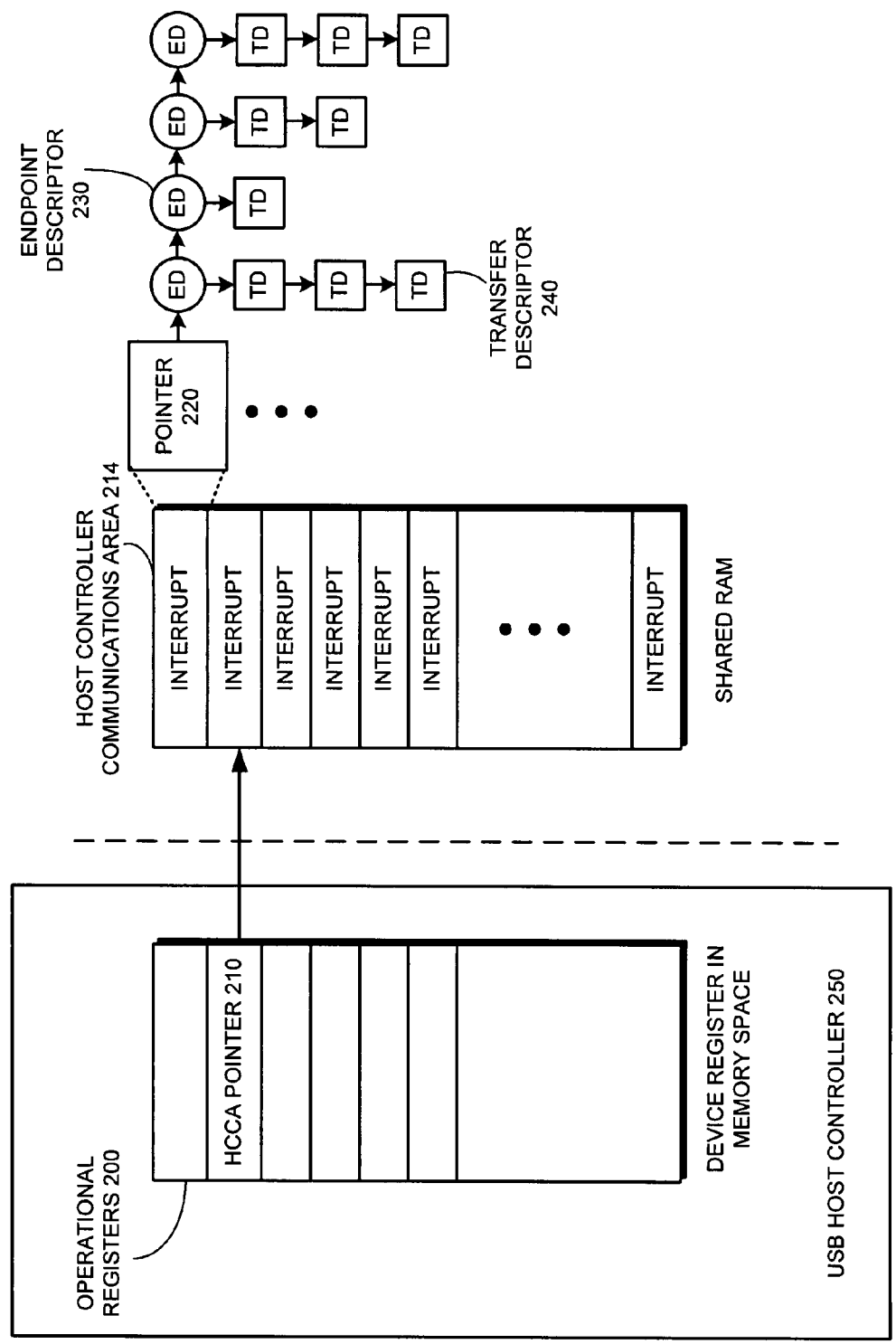
FIG. 2 illustrates an Open Host Controller Interface (OHCI) Specification USB Host Controller accessing I/O descriptors stored in the main memory.

FIG. 2 illustrates an Open Host Controller Interface (OHCI) Specification USB Host Controller accessing I/O descriptors stored in the main memory. There are four data transfer types defined in the USB specification. Each transfer type is optimized to match the service requirements between the client software and the USB device. The four transfer types are interrupt transfer, isochronous transfer, control transfer, and bulk transfer.

Interrupt transfers are small data transfers used to communicate information from the USB device to the client software. The Host Controller Driver polls the USB device by issuing tokens to the device at a periodic interval sufficient for the requirements of the device. Isochronous transfers are periodic data transfers with a constant data rate. Control transfers are non-periodic data transfers which communicate configuration/command/status type information between the client software and the USB device. Bulk transfers are non-periodic data transfers which communicate a large amount of information between the client software and the USB device.

Based on the Open Host Controller Interface Specification (OHCI), the data transfer types are classified into two categories: periodic and non-periodic. Interrupt and isochronous transfers are both periodic, because they are scheduled to run at periodic intervals. Control and bulk transfers are non-periodic, because they are not scheduled to run at any specific time, but rather on a time-available basis.

There are two communication channels between the Host Controller and the Host Controller Driver. As shown in FIG. 2, the first channel uses a set of operational registers, such as operational registers 200 located within the USB Host Controller 250. USB Host Controller 250 is the target for all communication on this channel. Operational registers 200 contain control, status, and list pointer registers. Within operational register 200 is a pointer 210 to a location in shared memory named the Host Controller Communications Area (HCCA) 214. HCCA 214 is the second communication channel, on which the USB Host Controller is the master for all communications.

The basic building blocks for communication across an USB interface are Endpoint Descriptor (ED), such as Endpoint Descriptor 230, and Transfer Descriptor (TD), such as Transfer Descriptor 240. An endpoint is a logical data source or sink. For example, a USB video camera may have two endpoints, one for video and one for audio. The USB Host Controller Driver allocates Endpoint Descriptors for each active endpoint in the attached USB device(s). An Endpoint Descriptor contains information necessary for the Host Controller to communicate with the endpoint. The fields of an Endpoint Descriptor include maximum packet size, endpoint address, speed of the endpoint, and direction of data flow. Endpoint Descriptors are linked in a list.

For a specific endpoint, the corresponding Endpoint Descriptor links to a queue of Transfer Descriptors. A Transfer Descriptor contains information necessary to describe the data packets to be transferred. The fields of a Transfer Descriptor include data toggle information, shared memory buffer location, and completion status codes. Each Transfer Descriptor contains information that describes one or more data packets. The data buffer for each Transfer Descriptor ranges in size from 0 to 8192 bytes with a maximum of one physical page crossing. Transfer Descriptors are linked in a queue, and the first one queued is the first one processed.

HCCA contains the head pointers to the interrupt Endpoint Descriptor lists. As shown in FIG. 2, HCCA 214 contains a list of pointers pointing to Endpoint Descriptors, such as pointer 220. The Endpoint Descriptors are arranged in a tree structure to facilitate the polling of endpoints corresponding to interrupts at different intervals. During operation, USB Host Controller 250 processes the list of Endpoint Descriptors contained in HCCA 214.

Note that the Endpoint and Transfer Descriptors for interrupt and isochronous data transfers both reside in the main memory, which is shared by the CPU. Hence, periodic reading of these descriptors by USB Host Controller 250 occupies PCI bus bandwidth and consumes extra power.

I/O Descriptor Cache for Access by I/O Controllers

Figure 3:
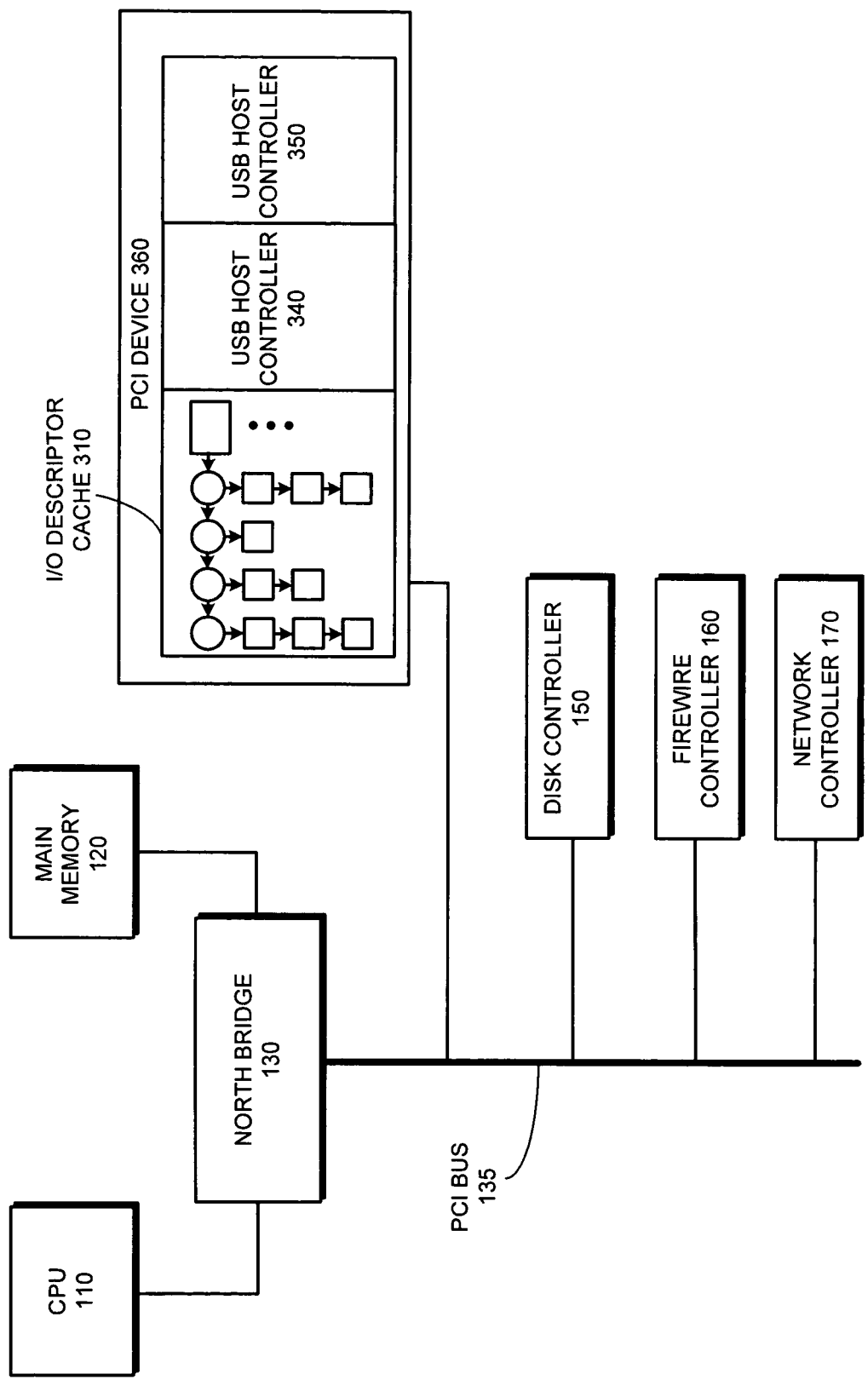
FIG. 3 illustrates an I/O descriptor cache located within a PCI device for access by I/O controllers in accordance with an embodiment of the present invention.

FIG. 3 illustrates an I/O descriptor cache located within a PCI device for access by I/O controllers in accordance with an embodiment of the present invention. One approach to eliminate the need for an I/O controller, such as the USB Host Controller, to access main memory is to place an I/O descriptor cache in the vicinity of the I/O controller. Such a configuration allows the I/O controller to access frequently used data without going to the main memory, thereby saving power in the CPU cache-coherence circuitry and freeing up I/O bandwidth and memory bandwidth.

One embodiment of the present invention shown in FIG. 3 includes an I/O descriptor cache 310 located within a PCI device 360, which contains one or more I/O controllers, such as USB Host Controllers 340 and 350. I/O descriptor cache 310 is mapped to an additional memory address space, which is separate from the memory space occupied by the main memory. Access to I/O descriptor cache 310 is provided through a PCI function within PCI device 360. The driver for USB Host Controllers 340 and 350 is responsible for initializing I/O descriptor cache 310's address space, thereby allowing the USB Host Controllers to use I/O descriptor cache 310. This configuration frees up PCI bandwidth because accesses to I/O descriptor cache 310 do not have to traverse PCI bus 135. I/O descriptor cache 310 stores USB descriptors, which are frequently polled by USB Host Controllers 340 and 350. Note that the system does not maintain a copy of the contents of I/O descriptor cache 310 in main memory 120.

Figure 4:
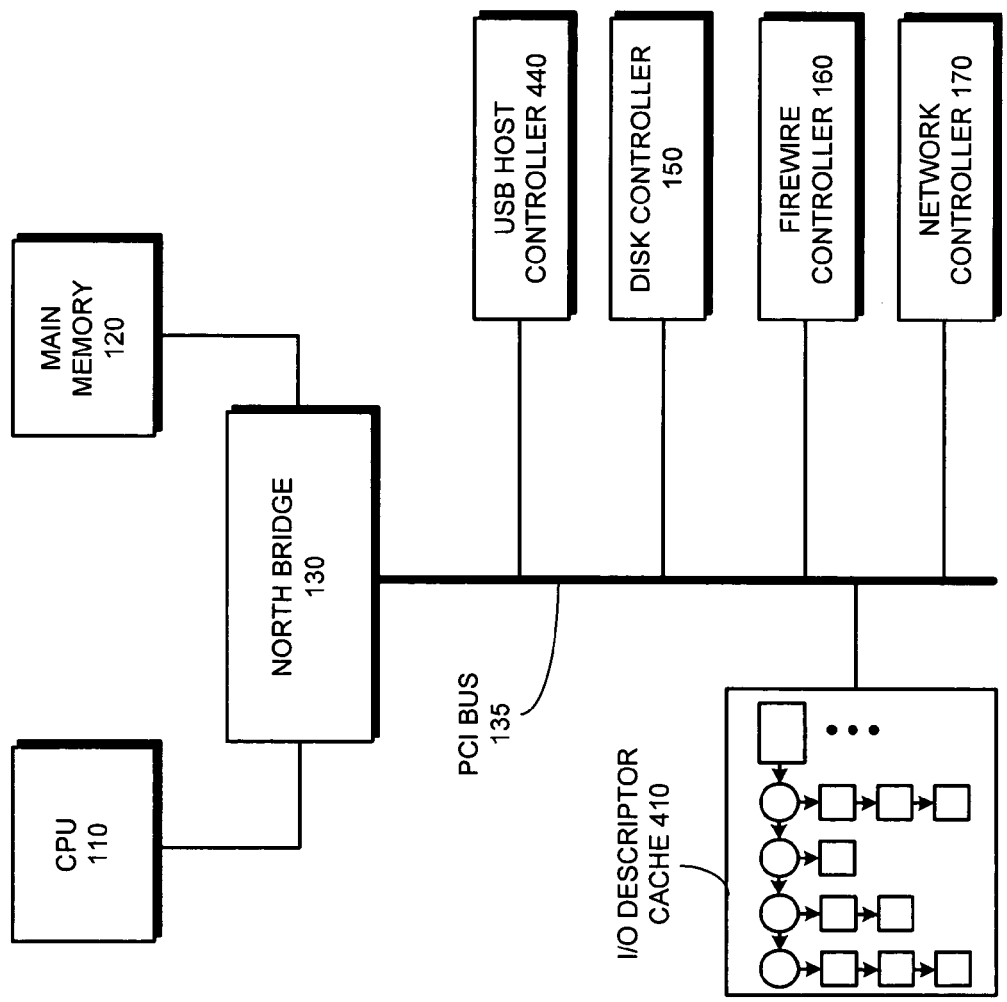
FIG. 4 illustrates an I/O descriptor cache located within a PCI device on a PCI bus in accordance with an embodiment of the present invention.

FIG. 4 illustrates an I/O descriptor cache located within a PCI device on a PCI bus in accordance with an embodiment of the present invention. In this embodiment, an I/O descriptor cache 410 resides on PCI bus 135 as a separate PCI memory device. USB Host Controller 440 may access descriptors stored in I/O descriptor cache 410 over PCI bus 135. This configuration allows controllers within other PCI devices residing on the same PCI bus to access I/O descriptor cache 410.

Figure 5:
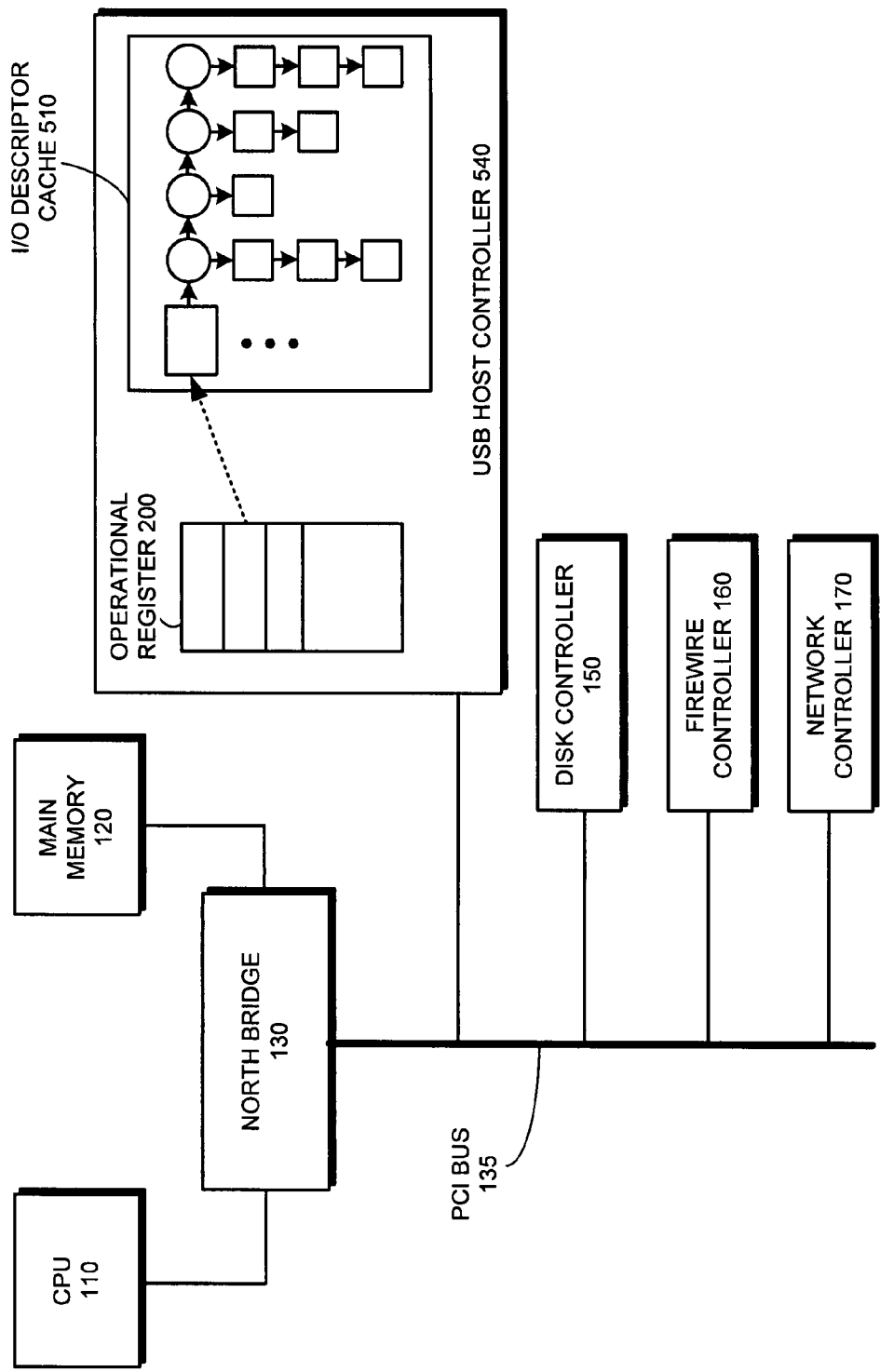
FIG. 5 illustrates an I/O descriptor cache located within a USB Host Controller in accordance with an embodiment of the present invention.

FIG. 5 illustrates an I/O descriptor cache located within a USB Host Controller in accordance with an embodiment of the present invention. This embodiment includes an I/O descriptor cache 510 located within an I/O controller, such as USB Host Controller 540. Although I/O descriptor cache 510 resides within USB Host Controller 540, it nevertheless functions as a separate PCI device, allowing other PCI devices to access it. I/O descriptor cache 510 could also be implemented in the same Application-Specific Integrated Circuit (ASIC) as USB Host Controller 540 so that no additional pins or board space is required.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that includes an I/O descriptor cache that is accessible over a PCI bus, comprising:

an I/O descriptor cache that stores descriptors that describe data to be transferred during corresponding I/O operations on a PCI bus internal to a computer system;

one or more I/O controllers configured to control one or more I/O devices and to access I/O descriptors stored in the I/O descriptor cache without having to access a main memory, thereby conserving I/O bandwidth and power;

wherein copies of descriptors stored in the descriptor cache are not present in a main memory; and wherein the I/O descriptor cache is located within one of the one or more I/O controllers, wherein the I/O controller can use the descriptor cache, wherein the I/O controller also functions as a PCI device that provides access to the descriptor cache to other devices via the PCI bus, and wherein the I/O controller is a Universal Serial Bus (USB) Host Controller.

2. The apparatus of claim 1, wherein the I/O descriptor cache resides in an additional memory address space which is separate from the address space used by the main memory.

3. The apparatus of claim 2,
wherein the I/O descriptor cache is configured to store USB descriptors required by the USB Host Controller.

4. A computer system that includes an I/O descriptor cache that is accessible over a PCI bus, comprising:
a CPU;
a main memory;
an I/O descriptor cache that stores descriptors that describe data to be transferred during corresponding I/O operations on a PCI bus internal to a computer system;
one or more I/O controllers configured to control one or more I/O devices, and to access I/O descriptors stored in the I/O descriptor cache without having to access the main memory, thereby conserving I/O bandwidth and power;
wherein copies of descriptors stored in the descriptor cache are not present in a main memory; and
wherein the I/O descriptor cache is located within one of the one or more I/O controllers, wherein the I/O controller can use the descriptor cache, wherein the I/O controller also functions as a PCI device that provides access to the descriptor cache to other devices via the PCI bus, and wherein the I/O controller is a Universal Serial Bus (USB) Host Controller.

5. The computer system of claim 4, wherein the I/O descriptor cache resides in an additional memory address space which is separate from the address space used by the main memory.

6. The computer system of claim 5,
wherein the I/O descriptor cache is configured to store USB descriptors required by the USB Host Controller.

7. A method that accesses an I/O descriptor cache, comprising: storing I/O descriptors frequently polled by one or more I/O controllers to control I/O operations in the I/O descriptor cache, wherein the I/O descriptor cache is located within one of the one or more I/O controllers, wherein the I/O controller can use the descriptor cache, wherein the I/O controller also functions as a PCI device that provides access to the descriptor cache to other devices via the PCI bus, and wherein the I/O controller is a Universal Serial Bus (USB) Host Controller; and
accessing I/O descriptors stored in the I/O descriptor cache from I/O controllers on the PCI bus without accessing a main memory, thereby conserving I/O bandwidth and power;
wherein copies of descriptors stored in the descriptor cache are not present in a main memory;
wherein the I/O operations occur across a PCI bus internal to a computer system.

8. The method of claim 7, wherein assigning an address space to the I/O descriptor cache involves assigning an additional memory address space which is separate from the address space used by the main memory.

9. The method of claim 8,
wherein storing I/O descriptors in the I/O descriptor cache involves storing USB descriptors required by the USB Host Controller.

\* \* \* \* \*

UNITED STATES PATENT AND TRADEMARK OFFICE
CERTIFICATE OF CORRECTION

PATENT NO.       : 7,634,587 B2  Page 1 of 1
APPLICATION NO.  : 10/916988
DATED            : December 15, 2009
INVENTOR(S)      : Ferguson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this

Ninth Day of November, 2010

David J. Kappos
*Director of the United States Patent and Trademark Office*